(12) United States Patent
Granacher

(10) Patent No.: US 9,835,204 B2
(45) Date of Patent: Dec. 5, 2017

(54) POWER TOOL

(71) Applicant: Hilti Aktiengesellschaft, Schaan (LI)

(72) Inventor: Thomas Granacher, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 93 days.

(21) Appl. No.: 14/787,189

(22) PCT Filed: Apr. 23, 2014

(86) PCT No.: PCT/EP2014/058165
§ 371 (c)(1),
(2) Date: Oct. 26, 2015

(87) PCT Pub. No.: WO2014/177427
PCT Pub. Date: Nov. 6, 2014

(65) Prior Publication Data
US 2016/0076603 A1    Mar. 17, 2016

(30) Foreign Application Priority Data
Apr. 30, 2013 (EP) ..................................... 13165881

(51) Int. Cl.
| | |
|---|---|
| *F16D 7/04* | (2006.01) |
| *F16D 43/202* | (2006.01) |
| *F16D 7/10* | (2006.01) |
| *F16D 41/12* | (2006.01) |

(52) U.S. Cl.
CPC ............... *F16D 7/048* (2013.01); *F16D 7/04* (2013.01); *F16D 7/10* (2013.01); *F16D 41/12* (2013.01); *F16D 43/2028* (2013.01)

(58) Field of Classification Search
CPC ... F16D 7/00; F16D 7/04; F16D 7/048; F16D 7/10; F16D 43/2028
See application file for complete search history.

(56) References Cited

U.S. PATENT DOCUMENTS

| | | | | |
|---|---|---|---|---|
| 415,653 | A | * 11/1889 | Racine | .................... F16D 7/048 464/37 |
| 1,818,690 | A | * 8/1931 | Carlson | .................... F16D 41/12 74/577 SF |

(Continued)

FOREIGN PATENT DOCUMENTS

| | | |
|---|---|---|
| DE | 19929833 | 1/2001 |
| DE | 102009046475 | 5/2011 |

(Continued)

*Primary Examiner* — Richard Lorence
*Assistant Examiner* — David Morris
(74) *Attorney, Agent, or Firm* — Davidson, Davidson & Kappel, LLC

(57) ABSTRACT

A slip clutch (19) for a hand-held power tool (1) that serves to uncouple a tool socket (2) from a driving motor (5) in the event of an overload is provided. An annular running surface (23) has cams (24) projecting radially inward. The slip clutch (19) has a set of pairs consisting of a preloaded coil spring (28) and a pawl (29). The coil spring (28) presses a head (38) of the pawl (29) in the radial direction outward onto the running surface (23). The pawl (29) has a sheet-metal strip (34) whose one section is bent into a hollow prism that is annularly closed, except for a gap, in order to form the head (38). An insert (35) is placed into the gap (41) so as to fill the gap (41).

9 Claims, 3 Drawing Sheets

(56) References Cited

U.S. PATENT DOCUMENTS

| | | | | | |
|---|---|---|---|---|---|
| 1,865,559 | A | * | 7/1932 | De Montgrand | F16D 7/048 464/37 |
| 2,688,389 | A | * | 9/1954 | Wittel | F16D 41/206 192/41 S |
| 2,818,950 | A | * | 1/1958 | Harless | F16D 41/12 192/43.1 |
| 3,219,163 | A | * | 11/1965 | Zlotek | F16D 41/07 192/45.1 |
| 3,702,649 | A | * | 11/1972 | Giese | F16D 41/07 192/104 B |
| 4,043,437 | A | * | 8/1977 | Taylor | F16D 67/02 188/218 XL |
| 4,417,650 | A | * | 11/1983 | Geisthoff | F16D 43/2028 192/56.1 |
| 5,246,094 | A | * | 9/1993 | Army | F02N 15/027 192/104 C |
| 2001/0035322 | A1 | * | 11/2001 | Reinhart | F16D 41/12 192/3.34 |
| 2006/0081434 | A1 | * | 4/2006 | Chen | F16D 41/30 192/64 |
| 2007/0199788 | A1 | * | 8/2007 | Chen | F16D 41/30 192/64 |
| 2012/0252585 | A1 | | 10/2012 | Stroissnigg et al. | |

FOREIGN PATENT DOCUMENTS

| | | | | | |
|---|---|---|---|---|---|
| EP | 2320104 | | 5/2011 | | |
| GB | 2257493 | A | * | 1/1993 | B62M 9/085 |

\* cited by examiner

POWER TOOL

BACKGROUND

The present invention relates to a slip clutch for a handheld power tool of the type known from German patent application DE 10 2009 046 475 A.

SUMMARY OF THE INVENTION

The present invention provides a slip clutch for a handheld power tool that serves to uncouple a tool socket from a driving motor in the event of an overload. An annular running surface has cams projecting radially inward. The slip clutch has a set of pairs, each consisting of a preloaded coil spring and a pawl. The coil spring presses a head of the pawl in the radial direction outward onto the running surface. The pawl has a sheet-metal strip whose one section is bent into a hollow prism that is annularly closed, except for a gap, in order to form the head. An insert is placed into the gap so as to fill said gap.

The slip clutch has a running surface that, in its normal position, transfers a torque to the pawls by means of a non-positive and frictional fit. In the event of an overload, the pawls are deflected against the force of the coil springs until the pawls are no longer in contact with the running surface. As a result, the slip clutch opens the drive train of the hand-held power tool. The coil springs push the pawls back into the normal position. The loads on the pawls during the opening and the return into the normal position depend, among other things, on the rotational speed of the slip clutch, especially if resonances of the pawl are excited.

The preferably loosely placed insert causes a damping of the resonances, thereby significantly increasing the service life of the pawls. A classic reinforcement, for example, due to thicker sheet-metal strips, does not entail any major improvement of the service life.

One embodiment provides that the width of the gap is smaller than the thickness of the sheet-metal strip. The insert is clamped in the gap.

The head can have a contact surface and a support surface, whereby the contact surface is in contact with the running surface, and a coil spring that is associated in pairs with the pawl is in contact with the support surface. The contact surface and the support surface are formed by the sheet-metal strip. One end of the support surface facing away from the contact surface is in contact with the insert. One embodiment provides that the end is clamped under pre-tensioning against the insert. The open end of the surface impinged upon by the coil spring is supported on the insert. The end can slide on the insert and can damp vibrations.

One embodiment provides that the sheet-metal strip is bent to form a cylindrical bearing head, a flat lever arm and the prismatic head. The insert can be held with a positive fit in the cylindrical bearing head. This prevents the insert from sliding.

One embodiment provides that the head is hollow. The hollow space occupies at least 25%, preferably at least 50%, of the volume of the head.

One embodiment provides that the insert is made of plastic or titanium.

BRIEF DESCRIPTION OF THE DRAWINGS

The description below explains the invention with reference to embodiments and figures given by way of example. The figures show the following.

Unless otherwise indicated, identical or functionally equivalent elements are designated by the same reference numerals in the figures.

DETAILED DESCRIPTION

Figure 1:
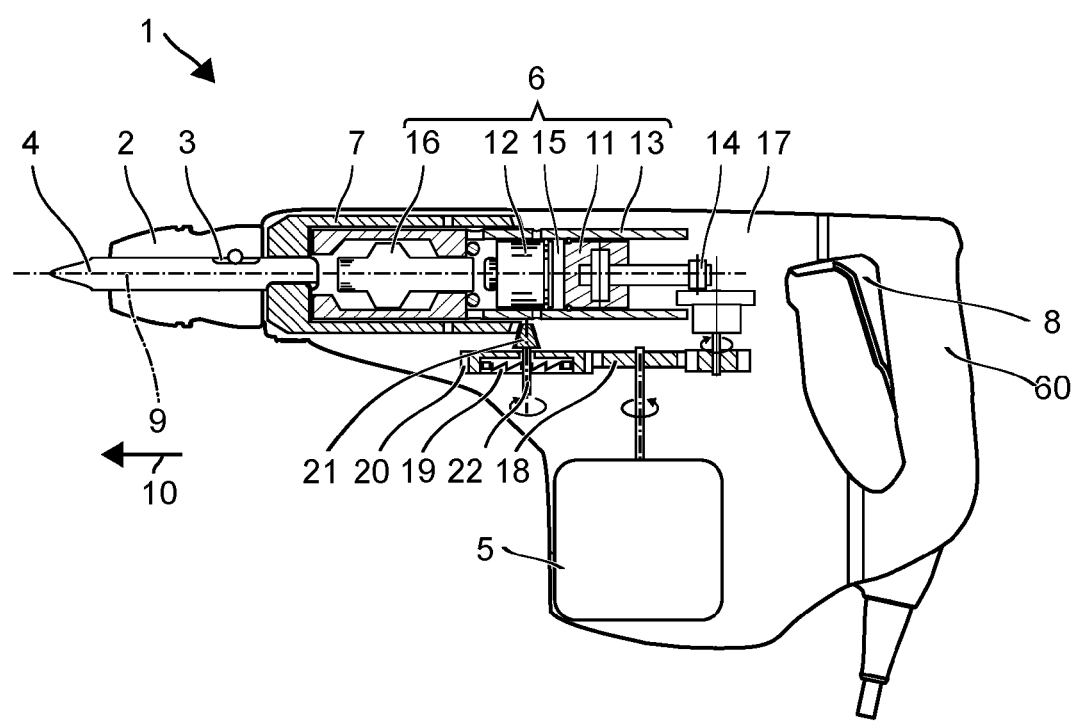
FIG. 1 a hammer drill.

FIG. 1 schematically shows a hammer drill 1 as an example of a chiseling hand-held power tool. The hammer drill 1 has a tool socket 2 into which the shank end 3 of a tool, e.g. a drill chisel 4, can be inserted. A motor 5—which drives a striking mechanism 6 and a driven shaft 7—constitutes the primary drive of the hammer drill 1. A user can hold the hammer drill 1 by means of a handle 60 and can start up the hammer drill 1 using a system switch 8. During operation, the hammer drill 1 continuously rotates the drill chisel 4 around a working axis 9, and in this process, it can hammer the drill chisel 4 into a substrate in the striking direction 10 along the working axis 9.

The striking mechanism 6 is, for example, a pneumatic striking mechanism 6. An exciter 11 and a striker 12 are installed in a guide tube 13 of the striking mechanism 6 so as to be movable along the working axis 9. The exciter 11 is coupled to the motor 5 via an eccentric 14 or a toggle element, and it is forced to execute a periodic, linear movement. An air cushion formed by a pneumatic chamber 15 between the exciter 11 and the striker 12 couples a movement of the striker 12 to the movement of the exciter 11. The striker 12 can strike a rear end of the drill chisel 4 directly, or else indirectly via an essentially stationary intermediate striker 16 and can transmit part of its pulse to the drill chisel 4. The striking mechanism 6 and preferably the other drive components are arranged inside a machine housing 17.

Figure 2:
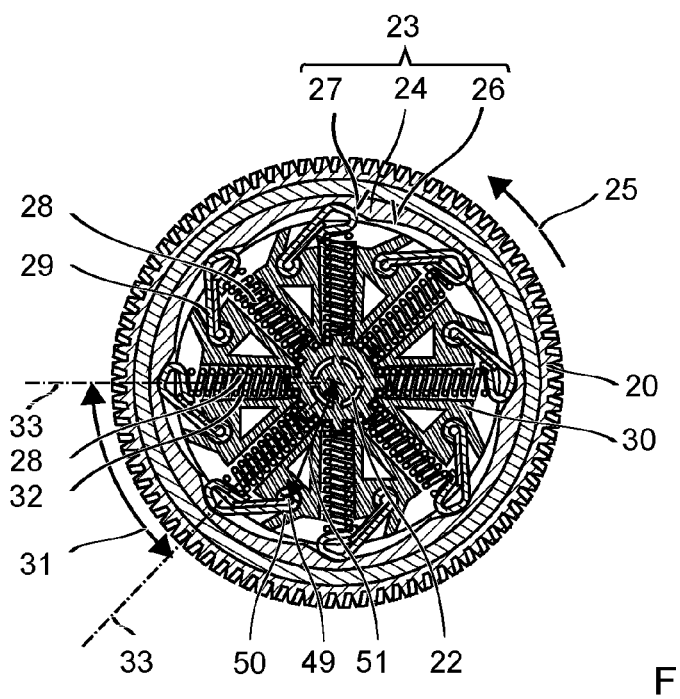
FIG. 2 a slip clutch.
Figure 3:
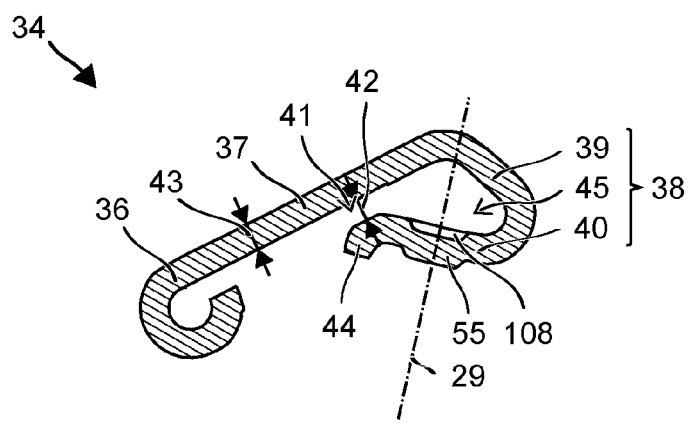
FIG. 3 the base body of a pawl.

The drive shaft 7 is coupled to the motor 5 via a gear 18 and a slip clutch 19. The slip clutch 19 is actuated when the torque that is present on the drive shaft 7 exceeds a threshold value, for example, when the drill chisel 4 is blocked. The slip clutch 19 shown by way of example has a hollow gear wheel 20 on the drive side and a bevel gear 21 on the driven side (FIG. 2). The slip clutch 19 is inserted into the hollow gear wheel 20 and couples the hollow gear wheel 20 to a shaft 22 of the bevel gear 21.

The drive side 20 has an annular running surface 23 that is arranged coaxially to the shaft 22. The running surface 23 has cams 24 projecting radially inwards. As seen in the direction of rotation 25, the cams 24 have a front flank 27 as well as a rear flank 26. The front flank 27 can be steeper than the rear flank 26.

The driven side 21 has several coil springs 28 and the same number of pawls 29, which are arranged on a disc 30. The disc 30 has several pockets 32 that are arranged at identical angular distances 31 and into each of which a coil spring 28 is placed. The coil springs 28 are oriented radially relative to the shaft 22. Each of the coil springs 28 defines an axis 33 that runs perpendicularly through the shaft 22. The forces exerted by the coil springs 28 act perpendicularly on the shaft 22.

Each of the coil springs 28 is paired with a pawl 29. The pawls 29 each comprise a bent sheet-metal strip 34 and an insert 35. The insert 35 is preferably made of a material that differs from that of the sheet-metal strip 34.

Figure 4:
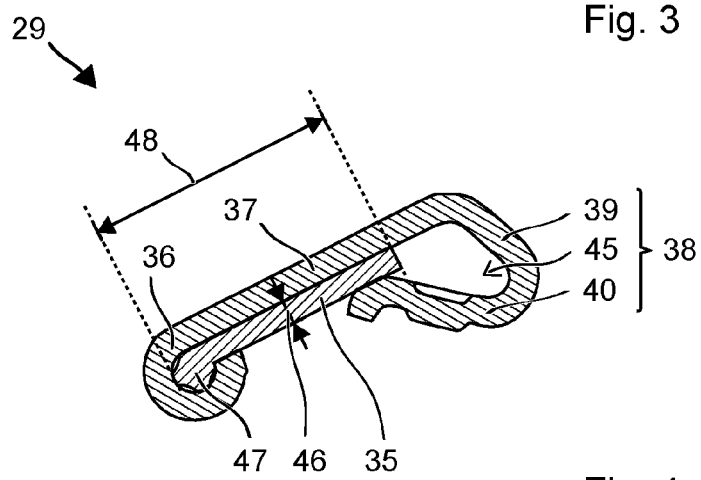
FIG. 4 a pawl.

The sheet-metal strip 34 is bent to form a bearing head 36, a lever arm 37 and a hollow head 38 (FIG. 4). A middle section of the sheet-metal strip 34 forms the lever arm 37 and is configured to be essentially flat. An outer section of the sheet-metal strip 34, directly adjacent to the middle section, is bent to form a hollow cylindrical outer contour that forms the bearing head 36. The cylindrical outer contour encloses an angle of between 200° and 300°, for example, 270°. The other outer section of the sheet-metal strip 34 that is adjacent to the middle section is shaped to form the hollow head 38. The head 38 has a prismatic, triangular shape. One side is closed off by the flat lever arm 37. A second side 39, which is connected to the lever arm 37, is slanted by between 90° and 135° relative to the lever arm 37. The third side 40—referred to below as the support surface 40—that adjoins the contact surface 39 is slanted by between 22° and 45° relative to the contact surface 39. The support surface 40 and the lever arm 37 enclose an acute angle of between 22° and 45°. The support surface 40 is at a distance from the lever arm 37 by a gap 41. The size 42 of the gap 41 is preferably not greater than the thickness 43 of the sheet-metal strip 34, for example, between 25% and 100% of the thickness 43. The edge 44 of the sheet-metal strip 34 facing the lever arm 37 can be bent open or rounded off. The hollow space 45 has a volume amounting to approximately 50% of the entire head 38.

Figure 5:
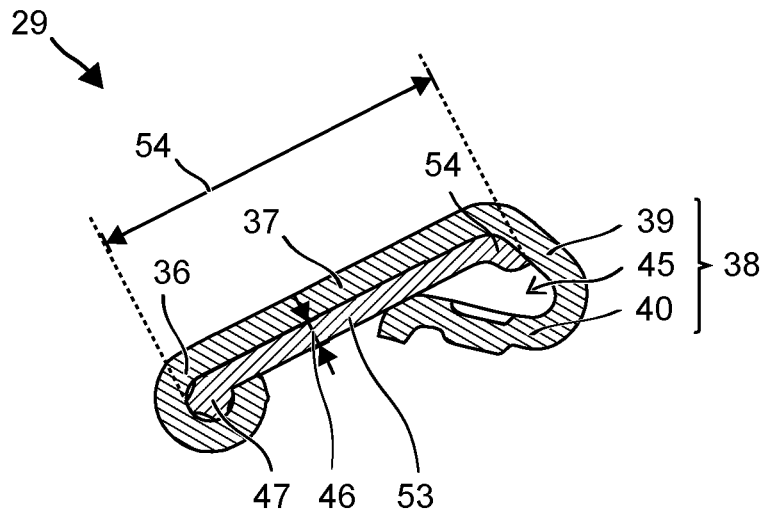
FIG. 5 a pawl.

The insert 35 is arranged in the gap 41 between the lever arm 37 and the support surface 40 (FIG. 5). The thickness 46 of the insert 35 is preferably greater than the size 42 of the gap 41, for example, 10% to 50% greater. The insert 35 is clamped to the lever arm 37 by the edge 44.

The insert 35 given by way of example is a flat platelet whose entire surface is in contact with the lever arm 37. One end 47 of the insert 35 is thickened, for example, to form a cylindrical contour. The end 47 is inserted with a positive fit into the hollow space 45 that is surrounded by the bearing head 36. This prevents the insert 35 from shifting along the lever arm 37. The length 48 of the insert 35 preferably corresponds to the distance of the bearing head 36 from the gap 41. The hollow head 38 is only negligibly filled by the insert 35 or not at all. The inertia is only slightly increased by the insert 35. The width of the insert 35 is approximately the same as the width of the lever arm 37.

The pawl 29 is inserted into the disc 30 so that it can pivot around a pivot axis 49. The bearing pedestal 50 is configured, for instance, as a cylindrical recess in the disc 30. The bearing head 36 can be inserted with a positive fit into the recess along the pivot axis 49. The pivot axis 49 is coaxial to the shaft 22. The distance 51 between the pivot axis 49 and the shaft 22 is preferably greater than 75% of the inner radius of the running surface 23. The bearing 50 is offset downstream from the shaft relative to the associated coil springs 28 arranged in pairs in the running direction 25. In the embodiment given by way of example, the bearing 50 is arranged in the center between the associated coil spring 28 and the coil spring 28 downstream in the running direction 25.

The support surface 40 of the pawl 29 is on the axis 33 of the paired coil springs 28. Preferably, the support surface 40 is oriented perpendicular to the axis 33. The coil spring 28 is inserted so as to be preloaded between the support surface 40 and the pocket 32. As a result, the pawl 29 is pressed with its contact surface 39 against the running surface 23. The slant of the contact surface 39 is preferably approximately the same as the slant of the front flank 27 of the cam 24. The running surface 23 can be rotated torque-free relative to the pawls 29 until the spring-loaded contact surface 39 comes to lie against the flank 26.

The support surface 40 has a projection 52 protruding in the direction of the coil spring 28. The projection 52 is embossed into the sheet-metal strip 34. With its last winding or with a ring formed by the last winding, the coil spring 28 surrounds the projection 52. This prevents the coil spring 28 from sliding along the support surface 40 when the pawl is deflected.

An applied torque leads to a deflection of the pawl 29 against the force of the coil spring 28. If the torque exceeds a critical value, the pawl 29 is deflected by the entire height of the cam 24 and the running surface 23 can continue to rotate torque-free. The pawl 29 follows the rear flank 26 of the radially widening running surface 23, until the pawl 29 strikes the next front flank 27. In this process, the head 38 of the pawl 29 is dynamically loaded by the coil spring 28. The gap 41 in the head 38 permits a displacement, whereby it is mainly the open edge 44 that shifts parallel to the lever arm 37. The friction between the edge 44 and the insert 35 damps natural vibrations of the pawl 29. Natural vibrations can be excited in the case of the uniformly rotating slip clutch 19 and can cause fatigue fractures.

The insert 35 is preferably made of titanium. The coefficient of friction between titanium and iron (sheet metal) is advantageously high for the damping properties. An alternative is plastic, which has a lower coefficient of friction with iron, but which brings about a damping due to thermal losses in case of elastic deformations.

FIG. 5 shows another embodiment of the insert 53. The insert 53 is an elongated platelet that is bent at the lengthwise ends 54. The length 56 of the insert 53 corresponds to the length of the lever arm 37, as a result of which the two lengthwise ends 54 in the bearing head 36 and in the head 38 are in contact at the angle formed between the lever arm 37 and the contact surface 39. The thickness 46 and the width of the insert 53 can be selected as in the preceding embodiment.

The insert 53 can be put in place under pre-tensioning. The insert 53 is pre-tensioned perpendicularly to the lever arm 37. This can be achieved, for instance, by an appropriate basic shape of the insert 53. The insert 53 is curved over its length 45, whereby the side facing the lever arm 37 is concave.

Figure 6:
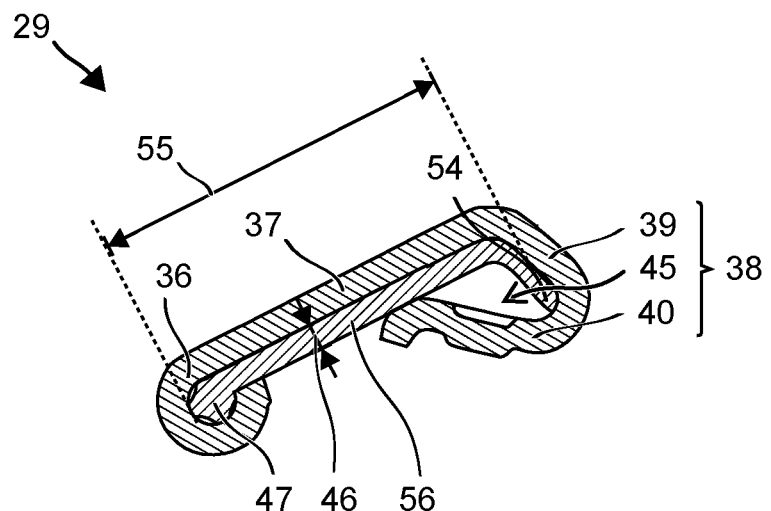
FIG. 6 a pawl.

FIG. 6 shows another embodiment of the insert 56. The insert 56 runs from the bearing head 36 to the angle between the contact surface 39 and the support surface 40. Thus, the insert 56 runs along the entire lever arm 37 and the entire contact surface 39. The insert 56 is put in place with a positive fit and optionally, the insert 35 can be put in place under pre-tensioning. The insert 56 can be excited to natural vibrations under the dynamic loads of the slip clutch 19. Due to the fact that the material is different from that of the sheet-metal strip 34 and in view of the slightly different dimensions, different natural vibrations are expected from the insert 56 and from the sheet-metal strip 34. The positive fit or non-positive fit permits a frictional coupling to each other, thereby suppressing a vibration of the resonances.

The surface 40 opposite from the support surface 40 is uncovered. The support surface 40, especially the edge 44, is freely movable relative to the insert 35 along the lever arm 37. This embodiment of the insert 56 has the highest degree of filling of the hollow head 38. The degree of filling is less than 50%. The degree of filling is the volume ratio of the section of the insert 35 that is situated in the head 38 relative to the defined hollow volume of the head 38 that is delineated by the sheet-metal strip 34.

The thickness 46 and the width of the inner 56 can be selected as in the preceding embodiment.

The invention claimed is:

1. A slip clutch for a hand-held power tool and serving to uncouple a tool socket from a driving motor in the event of an overload, comprising:

an annular running surface having cams projecting radially inward;

a set of preloaded coil springs and pawls combined in pairs, the coil spring pressing a head of the pawl in the radial direction outward onto the running surface, the pawl being formed as a sheet-metal strip with one section bent into a hollow prism that is annularly closed, except for a gap, in order to form the head; and an insert placed in the gap with a frictional fit so as to fill said gap.

2. The slip clutch as recited in claim 1 wherein a width of the gap is smaller than a thickness of the sheet-metal strip.

3. The slip clutch as recited in claim 1 wherein the head has a contact surface and a support surface, the contact surface being in contact with the running surface and a respective coil spring of the set of coil springs associated in pairs with a respective pawl of the pawls being in contact with the support surface, the contact surface and the support surface being formed by the sheet-metal strip, and one end of the support surface facing away from the contact surface being in contact with the insert.

4. The slip clutch as recited in claim 3 wherein the end is clamped under pre-tensioning against the insert.

5. The slip clutch as recited in claim 1 wherein the sheet-metal strip is bent to form a cylindrical bearing head, a flat lever arm and the prismatic head.

6. The slip clutch as recited in claim 5 wherein the insert is held with a positive fit in the cylindrical bearing head.

7. The slip clutch as recited in claim 5 wherein the cylindrical bearing head is hollow.

8. The slip clutch as recited in claim 1 wherein the insert is made of plastic or titanium.

9. The slip clutch as recited in claim 1 wherein the head has an embossed projection onto which the coil spring is placed.

\* \* \* \* \*